Figure 3:
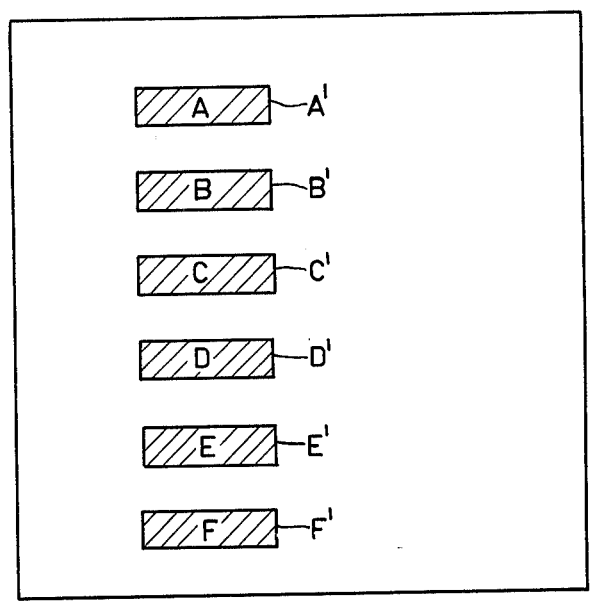

United States Patent [19]

Somers

[11] 4,320,428
[45] Mar. 16, 1982

[54] MULTITRACK THIN-FILM MAGNETIC HEAD WITH STACKED ELECTRIC LEADS

[75] Inventor: Gerardus H. J. Somers, Eindhoven, Netherlands

[73] Assignee: U.S. Philips Corporation, New York, N.Y.

[21] Appl. No.: 113,846

[22] Filed: Jan. 21, 1980

[30] Foreign Application Priority Data

Feb. 28, 1979 [NL] Netherlands .................. 7901577

[51] Int. Cl.³ .................. G11B 5/20; G11B 5/16; G11B 5/28; G11B 5/30
[52] U.S. Cl. .................. 360/123; 360/121; 360/112; 360/113
[58] Field of Search .............. 360/123, 121, 126, 112, 360/113

[56] References Cited

U.S. PATENT DOCUMENTS 4,065,797  12/1977  Nomura et al. ............. 360/122

FOREIGN PATENT DOCUMENTS 55-4734  1/1980  Japan ............................ 360/123

Primary Examiner—Robert S. Tupper
Attorney, Agent, or Firm—Robert S. Smith

[57] ABSTRACT

Elimination of cross talk in an array of integrated magnetic transducing heads by not arranging the electric input and output leads to which the individual transducing elements are connected in one plane but stacking them one on the other with the interposition of an electrically insulating layer.

5 Claims, 8 Drawing Figures

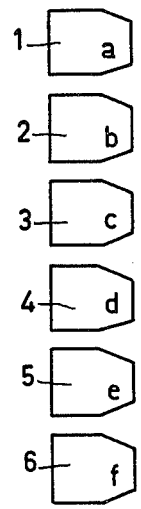
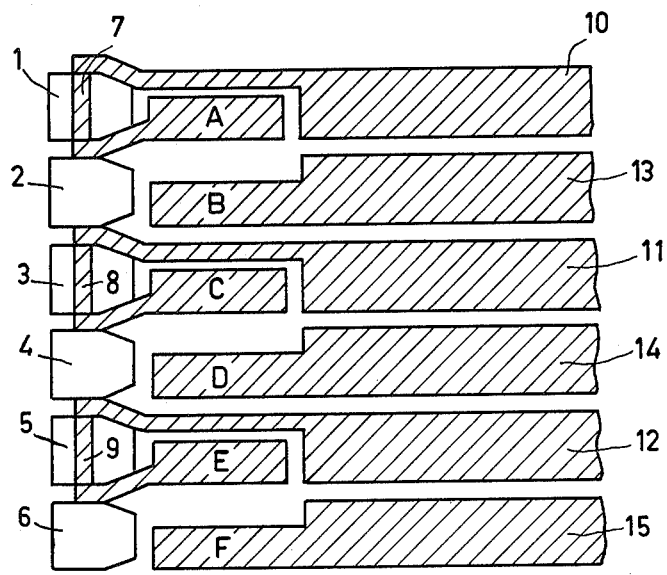
FIG.1
FIG.2

MULTITRACK THIN-FILM MAGNETIC HEAD WITH STACKED ELECTRIC LEADS

The invention relates to a magnetic transducer head destined to be brought, in operation, into a magnetic flux coupling relationship with a magnetic recording medium which for that purpose is moved past the head. The head comprises a substrate which supports a number of magnetic transducer elements of the thin-film type, each element being connected by two spatially separated strip-shaped electric leads to two bonding pads.

Such a magnetic transducer head having a large number of transducer elements (of the order of a hundred) is disclosed in British Pat. No. 1,307,886. The transducer elements of the said known head are each provided with a U-shaped copper strip which forms an inductive element (coil) with a single electric turn. The limbs of the U-shaped strips which are situated in a common plane serve as connection leads to the bonding pad. Since these connection leads occupy a large area as compared with the area which is occupied by the actual turn (the horizontal limb of the U), they cause a non-negligible stray field upon writing and in addition they pick up desired signals upon reading. In particular when two adjacent transducer elements are used simultaneously, one for writing and the other one for reading, great difficulties occur with these undesired cross talk effects. For example, a current may be induced in one head by the writing current in the other head so that the other head also starts writing. In order to avoid this, the writing current in the first head could theoretically be chosen to be so low that the current induced in the second head is not sufficient to write. When such low writing currents are used it is not certain that all heads (of, for example, an array of a hundred heads) show the same (reproducible) writing behavior. So in practice the writing current is chosen to be considerably higher than this minimum value.

It is an object of the invention to provide a magnetic transducer head of the kind described in the opening paragraph which shows a reduced cross talk. For that purpose, the magnetic transducer head according to the invention is characterized in that the two strip-shaped electric leads of each magnetic transducer elements are stacked one on top of the other over the greater part of their length in the direction transverse to the substrate surface with the interposition of an electrically insulating layer.

By arranging the input and output leads of the individual transducer elements one on top of the other instead of positioning them in a flat plane, and by separating them from each other by means of a thin electrically insulating layer of, for example, quartz, it is found that the magnetic radiation and pick-up properties of the leads are considerably attenuated so that the cross talk is reduced. Experiments have demonstrated that with a given head having input and output leads situated one on top of the other a reduction of the cross talk by at least 40 dB occurred as compared with a similar head having leads positioned beside each other in one plane.

A space-saving preferred embodiment of the transducer head of the invention is characterized in that of every two stacked electric conductors the one conductor situated further from the substrate is shorter than the conductor situated nearer to the substrate and that their bonding pads are aligned.

As a result of the above-described configuration, the electrical conductors need not fan out to facilitate the connection of their bonding pads to further wiring. This has a space-saving effect.

A further preferred form of the transducer head of the invention is characterized in that the electric turn of a first transducer element together with one of the electric leads is situated in a first conductor layer, while the other electric lead is situated in a second conductor layer, and that the electric turn of a transducer element situated beside the first transducer element together with one of the electric leads is situated in the second conductor layer, while the other electric lead is situated in the first conductor layer. In this manner it is possible to position adjacent transducer elements nearer to each other than the transducer elements of a thin-film head in which the leads are situated in one plane. In this latter head the intermediate space between two adjacent elements must always be sufficient so that two leads (one of each transducer element) may fit in between. In the head of the invention the two leads may be situated one on top of the other so that the intermediate space need only be half.

Figure 4:
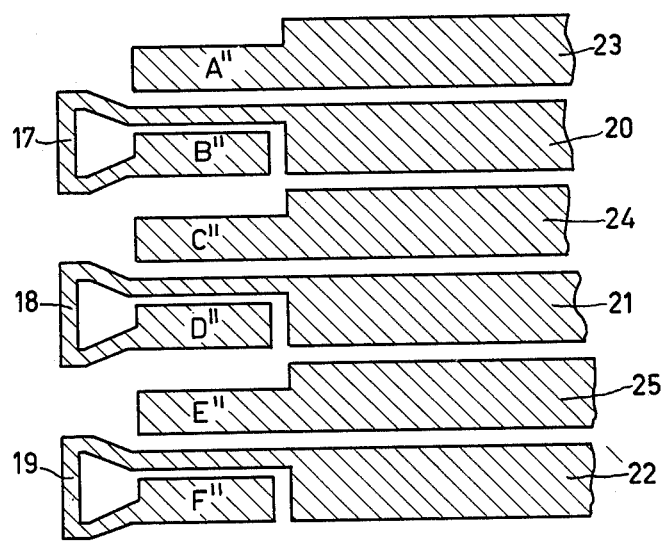
Figure 5:
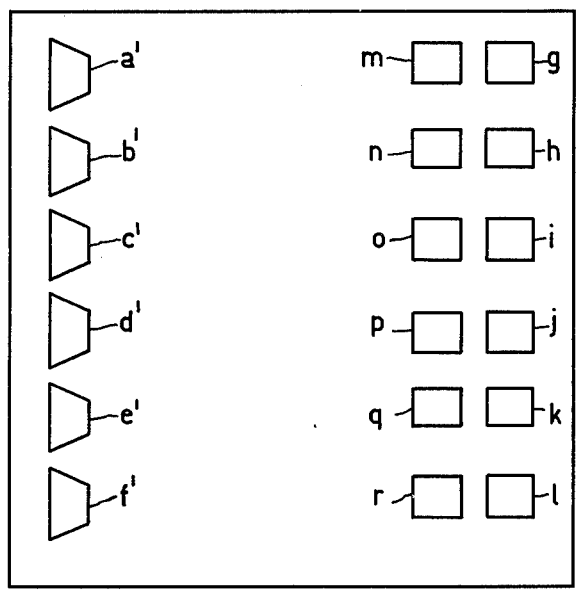
Figure 6:
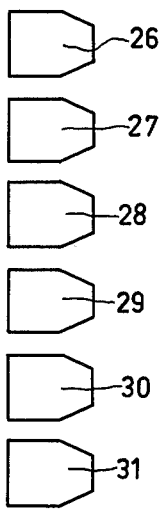
Figure 7:
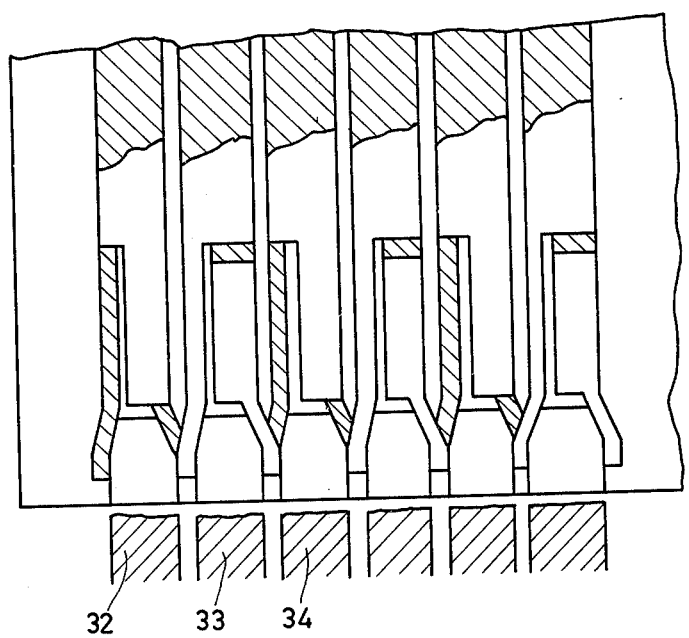
Figure 8:
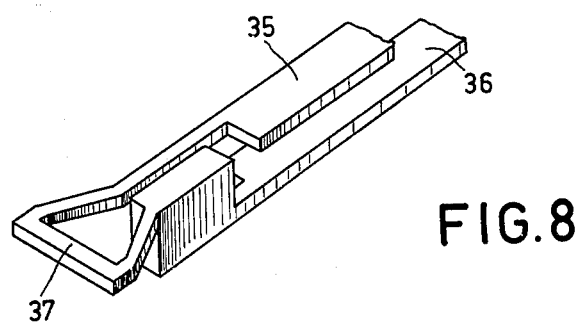

The invention which may be used both in inductive transducer heads and in flux-sensitive transducer heads of the magneto-resistive type or of the Hall-effect type will now be described in greater detail, by way of example with reference to the accompanying drawings. In the drawings:

FIG. 1 shows a first poleshoe pattern in a first stage of the manufacture of an embodiment of a multitrack thin-film head, FIG. 2 shows a first pattern of turns with current input and output leads in a second stage of the manufacture, FIG. 3 shows a first pattern of interconnection holes in a third stage of the manufacture, FIG. 4 shows a second pattern of turns with current input and output leads in a fourth stage of the manufacture, FIG. 5 shows a second pattern of interconnection holes in a fifth stage of the manufacture, FIG. 6 shows a second pattern of pole shoes in a sixth stage of the manufacture, FIG. 7 is a (simplified) plan view of a six-element thin-film head having input and output leads and turns situated at two levels, and FIG. 8 is a perspective view of the input and output leads and the turn of one single transducer element.

The magnetic transducer head of the invention can be manufactured as a multi-layer photo-etched thin-film structure provided on a thermally oxidized silicon substrate. Silicon wafers are cheap, flat and smooth and are good heat conductors. Long rows of transducer heads can be provided on such a wafer after which it can easily be severed into chips of any desired size. Standard sputter and photo-etching methods may be used to manufacture the multi-layer structures, as will be explained hereinafter.

A layer of nickel-iron is electro-deposited in a thickness of 3 $\mu$m from a bath of the Wolf type on a thermally oxidized silicon substrate (not shown). A pattern of magnetic poleshoes 1, 2, 3, 4, 5, 6 (FIG. 1) is formed from this layer by means of a chemical etching treatment. A first layer of electrically insulating material (SiO$_2$) in a thickness of 1 $\mu$m is sputtered on said pattern. A first electrically conductive layer is then provided (in fact a three-fold layer: 1000 Å molybdenum for the adhesion, 2 /μm gold, and again 1000 Å molybdenum for the adhesion of the subsequent layer). A pattern is formed from this conductive layer by means of sputter etching which defines for each odd-numbered transducer element a turn and a current input lead and for each even-numbered transducer element defines a current output lead (FIG. 2). The turns are references 7, 8, 9, the current input leads are referenced 10, 11, 12 and the current output leads are referenced 13, 14, 15. A, B, C, D, E and F denote the locations of the pattern which at a later stage of the manufacture are connected to a second conductor pattern. A second electrically insulating layer (SiO$_2$) in a thickness of 1 /μm is sputtered on the first electrically conductive layer. Interconnection holes A', B', C', D', E', F' (FIG. 3) are provided in said layer by means of a chemical etching process, which holes correspond to the locations, A, B, C, D, E, F of the conductor pattern shown in FIG. 2.

A second electrically conductive layer is provided on the second electrically insulating layer in the same manner and in the same composition as that of the first electrically conductive layer.

From this second electrically conductive layer a pattern is formed by means of sputter etching which defines a current output lead for each odd-numbered transducer element and a turn and a current inlet lead for each even-numbered transducer element (FIG. 4). The turns are identified by reference numerals 17, 18, 19; the current input leads are referenced 20, 21, 22 and the current outlet leads are referenced 23, 24, 25. At the locations denoted by A", B", C", D", E" and F" the second conductor pattern contacts the locations of the first conductor pattern denoted by A, B, C, D, E, F (FIG. 2) via the interconnection holes A', B', C', D', E', F', in the insulating layer (FIG. 3).

In the manufacture of the transducer elements, for example, on the poleshoe 1, a turn 7 is provided which is connected to a current input lead 10 which extends in the first conductor layer and is connected to a current output lead 23 which extends in the second conductor layer. The transducer head is completed by sputtering a third insulating layer of SiO$_2$ in a thickness of 1 /μm on the second conductor layer. Herein are provided by means of chemical etching interconnection holes a', b', c', d', e', f' which extend up to the locations a, b, c, d, e, f of the nickel-iron of the first magnetic layer. It is via these holes that the magnetic circuits on the rear side are closed in a subsequent stage. Electric interconnection holes g, h, i, j, k, l extend up to the first conductor layer (in order to connect the leads 10, 11, 12, 13, 14 and 15 to an electric circuit in a later stage) and electric interconnection holes m, n, o, p, q, r extend up to the second conductor layer (to connect the leads 20, 21, 22, 23, 24, 25 to an electric circuit in a later stage). This is best seen in FIG. 5. A second layer of electroplated nickel-iron in a thickness of 3 /μm is then provided from which a pattern of poleshoes 26, 27, 28, 29, 30, 31 is formed by chemical etching (FIG. 6). In this manner a six-element transducer head for reading or writing of information tracks 32, 33, 34 and so on situated very close together is obtained as is shown in the plan view of FIG. 7. The components formed in the lower one of the two conductor layers are shown shaded.

FIG. 8 shows by way of example how an input lead 35, an output lead 36 and a turn 37 are situated relative to each other in one single transducer element.

Although the invention has been described with reference to transducer elements having a single turn, it may equally readily be applied to transducer elements having a number of turns exceeding one, for example, four or six turns. These turns may be situated either at different levels or at a single level (flat coil). If read only transducing elements are required, strips of nickel-iron which show a magneto-resistive effect may be provided instead of the turns.

Comparative measurements have been carried out on the head of the invention having two transducer elements which had each been provided with a so-called counter head and on a head of a conventional leads design also having two transducer elements which had each been provided with a so-called counter head. In both cases the transducer elements had the same length (250 /μm), width (110 /μm) and pitch (250 /μm). A counter head actually is merely a secondary electric turn extending through the gap between the poleshoes and being thus coupled inductively to the main turn. Current was passed through the main turn of one of the elements and the cross talk signal induced in the counter head added to an adjacent element was measured. Both in the situation in which the turn of the adjacent elements was open and closed. The signal measured in a counter head of one element of a pair of transducer elements having leads situated one above the other proved to be at least 40 dB below the signal measured in a counter head of one element of a pair of transducer elements having leads situated in one plane (currents were used up to 125 mA with frequencies up to 500 kHz).

What is claimed is:

1. A magnetic transducer head destined to be brought in operation, into a magnetic flux-coupling relationship with a magnetic recording medium which for that purpose is moved past the head, the head comprising a substrate which supports a plurality of magnetic transducer elements of the thin-film type, each element being connected by two spatially separated strip-shaped electric leads to two bonding pads, characterized in that said two leads of each element are generally planar and are stacked one on top of the other over the greater part of their length in generally registered relationship with an electrically insulating layer interposed therebetween, the transducer elements being formed by magnetic circuits, each magnetic circuit being coupled to an electric turn to generate a transducing action between magnetic flux in the circuit and a current in the turn, each turn comprising two ends situated in one plane and connected to the electric leads.

2. A transducer head as claimed in claim 1, characterized in that the electric turn of a first transducer element together with one of the electric leads is situated in a first conductor layer, while the other electric lead is situated in a second conductor layer, and that the electric turn of a transducer element situated beside the first transducer element together with one of the electric leads is situated in the second conductor layer, the other electric lead being situated in the first conductor layer.

3. A magnetic transducer head destined to be brought in operation, into a magnetic flux-coupling relationship with a magnetic recording medium which for that purpose is moved past the head, the head comprising a substrate which supports a plurality of magnetic transducer elements of the thin-film type, each element being connected by two spatially separated strip-shaped electric leads to two bonding pads, characterized in that said two leads of each element are generally planar and are stacked one on top of the other over the greater part of their length in generally registered relationship with an electrically insulating layer interposed therebetween, the transducer elements are formed by flux-sensitive elements, each flux-sensitive element on two oppositely located sides having two ends situated in one plane and being connected to the strip-shaped electric leads.

4. A transducer head as claimed in claim 3, characterized in that the flux-sensitive element of a first transducer element together with one of the electric leads is situated in a first conductor layer, while the other electric lead is situated in a second conductor layer, and that the flux-sensitive element of a transducer element situated beside the first transducer element together with one of the two electric leads is situated in the second conductor layer, while the other electric lead is situated in the first conductor layer.

5. A transducer head as claimed in claims 1 or 3 characterized in that of every two electric leads stacked one on the other the lead situated further from the substrate is shorter than the lead situated nearer to the substrate and that their bonding pads are aligned.

* * * * *